United States Patent [19]

Thompson

[11] 4,323,938
[45] Apr. 6, 1982

[54] ROLLING PIVOT FOR MAGNETIC HEAD

[75] Inventor: Herbert E. Thompson, Los Gatos, Calif.

[73] Assignee: Xerox Corporation, Stamford, Conn.

[21] Appl. No.: 152,975

[22] Filed: May 23, 1980

[51] Int. Cl.$^3$ .......................... G11B 5/54; G11B 5/56; G11B 21/12; G11B 21/24

[52] U.S. Cl. .................................. 360/105; 360/104; 360/109

[58] Field of Search ....................... 360/104, 105, 109

[56]  References Cited

U.S. PATENT DOCUMENTS 3,946,439  3/1976  Castrodale et al. ................. 360/105

Primary Examiner—Robert S. Topper
Attorney, Agent, or Firm—Leonard Zalman

[57] ABSTRACT

A recording apparatus in which the cantilevered arm supporting a recording device has a smoothly curved surface adjacent the flexure spring joining the arm to a carriage whereby a rolling pivot is provided such that the bending stress on the flexure spring is minimized and is constant and independent of the degree that the cantilevered arm is raised. An end of the cantilevered arm is held against the carriage by a spring, one end of which is coupled to a translation mechanism which permits the recording device load force to be adjusted.

5 Claims, 4 Drawing Figures

ROLLING PIVOT FOR MAGNETIC HEAD

BACKGROUND OF THE INVENTION

A spring loaded cantilevered arm is commonly used to support the moveable transducer of a "floppy" disc system. The coupling of the arm to the transducer carriage is conventionally achieved by a light flexure spring. U.S. Pat. No. 4,151,573 shows an exemplary conventional flexure spring arrangement in which a portion of a flexure spring is bonded within an end of the arm. Due to that bonding arrangement, only very small portions or radii of the flexure spring bend when the arm is raised. Since the stress on the flexure spring is inversly porportional to the bending radius of curvature, small bending radii will subject portions of the flexure spring to large stress concentrations which often lead to fatigue failure.

The prior art teaches that spring loading of the cantilevered arm can be achieved by compressed or tensioned coiled springs. The forces exerted on the flexure spring by the coiled spring often produce deformation or bending of the flexure spring. Such bending may also produce fatigue failure. Also, the spring force of the prior art systems is not readily adjustable and, accordingly, the head load cannot be readily changed.

In addition to being prone to fatigue failure, the flexure spring mounting arrangements of the prior art permit excessive resonant vibration of the support arm. Such resonant vibration occurs because the support arm is in effect mounted on two springs (one coiled and one flexure). Furthermore, the mounting arrangements of the prior art do not provide tortional rigidity in all axes, which is another source of system vibration.

SUMMARY OF THE INVENTION

In accordance with the invention, a portion of the cantilevered arm supporting a transducer of a data storage system is structured to have a curved surface, and a flexure spring is fastened to the cantilevered arm and to the transducer carriage in a manner that has the flexure spring in contact with a portion of the curved surface of the cantilevered arm. A tensioned coiled spring holds a portion of the flexure spring between a portion of the curved surface and a flat portion of the transducer carriage such that a rolling pivot is provided for the cantilevered arm. One end of the coiled spring is mounted to the transducer carriage, with the other end of the coiled spring attached to a translation mechanism which can move that end of the coiled spring longitudinally along the cantilevered arm.

By mounting the flexure spring in a rolling pivot arrangement, the flexure spring has a relatively large bending radius when the arm is raised. That large bending radius distributes stress concentration over a relatively large portion of the flexure spring whereby large stress concentrations are avoided and, as a result, fatigue failure is minimized. In addition to minimizing fatigue failure, the rolling pivot structure provides tortional rigidity in all axes whereby deleterious vibrations are reduced.

The ability to adjust head load force is a desirable feature of any magnetic head assembly. The disclosed structure provides that adjustment capability because the length of the coiled spring moment arm can be changed simply by movement of the translation mechanism to which the coiled spring is coupled at one end. Also, since the equivalent spring rate of the coiled spring at the head is small, the head load force change is small as the head is lifted.

DETAILED DESCRIPTION OF THE INVENTION

Figure 1:
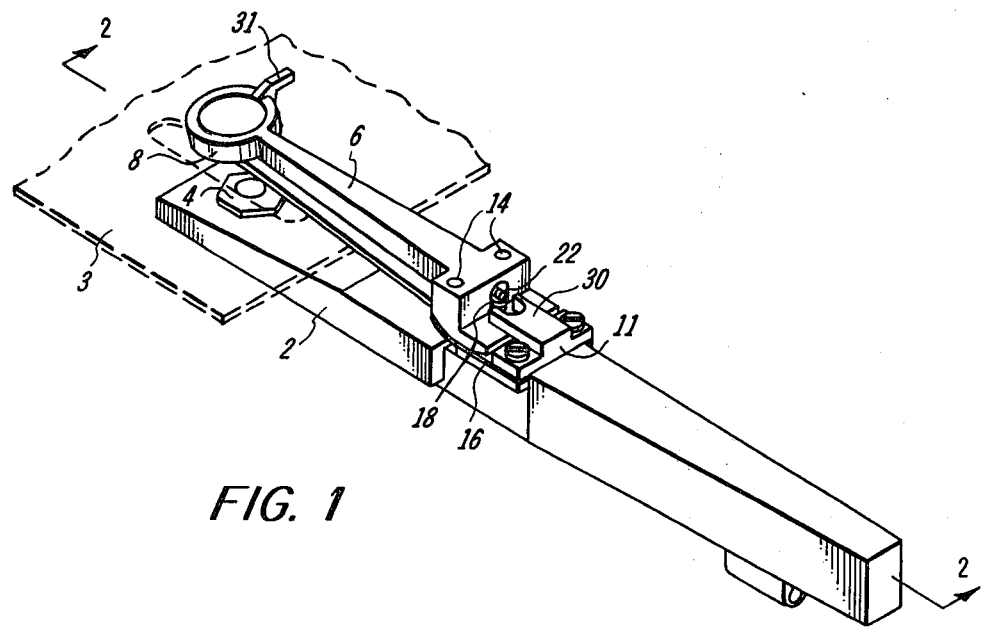
FIG. 1 is a perspective view of a magnetic head assembly in accordance with the invention.
Figure 2:
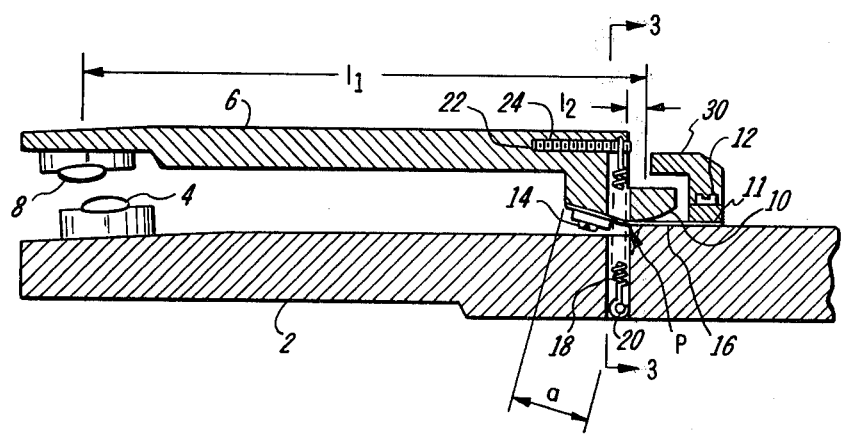
FIG. 2 is a sectional view of the assembly of FIG. 1 taken along line 2—2.
Figure 3:
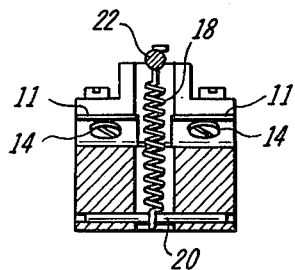
FIG. 3 is a sectional view taken along line 3—3 of FIG. 2.

The invention will be described in the environment of a floppy disc system that records information on both sides of a floppy disc, although it is equally applicable to single side recording. Referring first to FIGS. 1, 2, and 3, adjacent the free end of a carriage 2 is mounted a fixed transducer 4. Transducer 4 may be positioned to penetrate or intercept slightly the nominal plane of the floppy disc 3. Also mounted at the end of carriage 2, spaced apart from transducer 4, is a low mass, relatively stiff cantilevered support or load arm 6 having thinned areal sections along its length for purposes of reducing weight without reducing rigidity. A transducer 8 is supported by arm 6 in a position adjacent transducer 4. Arm 6 is raised by tab 31 with a conventional head load/unload solenoid (not shown). Transducers 4 and 8 may be of any conventional type, including a read/write core, an erase core, and associated energizing leads.

The end of arm 6 remote from transducer 8 is provided with a smoothly curved surface 10. Arm 6 is coupled to the carriage by a flat flexure spring 11 which is clamped or fastened to carriage 2 by screws 12 which extend through upstop 30 and fastened to arm 6 by screws 14. Flexure spring 11 may be of conventional thickness and composition, such as, for example, it can be 0.002 inches thick and made of stainless steel.

Arm 6 is biased toward a flat surface 16 of carriage 2 by a tensioned load spring 18. One end of spring 18 is mounted in a stationary manner to carriage 2, such as by connecting it to a rod 20 located within a slot in the carriage, and the other end of spring 18 is connected to a translation mechanism 22. Translation mechanism 22 may be a screw which is deposed within a threaded bore 24 of the arm 6, such bore extending generally longitudinally along arm 2 as shown in FIG. 2.

As clearly shown by FIGS. 1 and 2, the described mounting arrangement (1) hold the flexure spring 11 in contact with curved surface 10 over a portion "a" thereof, and (2) establishes a rolling pivot point "p" for arm 6 when it is raised. By mounting the flexure spring 11 in a rolling pivot arrangement, the flexure spring 11 has a relatively large bending radius when arm 6 is raised. Since the stress on flexure spring 11 is inversely proportional to twice the radius of curvature of the rolling pivot, that is, $$\text{stress} = \frac{(\text{modulus of elasticity of spring 11})(\text{thickness of spring 11})}{2\,(\text{radius of rolling pivot})},$$

the large bending radius reduces stress concentrations of flexure spring 11 whereby large stress concentrations are avoided, and, as a result, fatigue failure of flexure spring 11 is minimized. The rolling pivot arrangement can be achieved with surface 10 having any smoothly curved configuration, however, a fixed rate of curvature, such as provided by a section of a circle of, for example, ½ inch radius, is preferred. Because this rate of curvature is a constant, then as arm 6 is raised the bending stress of spring 11 is also a constant and independent of the degree that arm 6 is raised as opposed to conventional springs where stress increases in direct proportion to the deflection.

Figure 4:
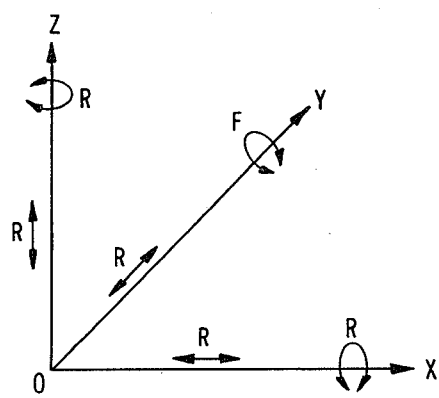
FIG. 4 shows degrees of freedom along different axes of the movable arm of the assembly of FIG. 1.

FIG. 4 illustrates what degrees of freedom arm 6 has due to the rolling pivot arrangement, wherein R depicts rigidity and F freedom of movement. It is seen that arm 6 does not have translational freedom in either the X, Y, or Z axes, and that it does not have rotational freedom in the X and Z axes. The only degree of freedom allowed by the rolling pivot is rotational freedom about the Y axis which is the desired freedom in order that arm 6 may be raised and lowered about that axis. By permitting only rotational motion about the Y axes, the rolling pivot arrangement substantially reduces deleterious head vibration. Also, when arm 6 is lifted about the Y axis its motion is relatively friction free.

Coupling of one end of load spring 18 to translation mechanism 22 permits convenient translational movement of that end of the load spring, resulting in adjustment of the movement arm $l_2$ of the load spring. Since the equivalent spring rate K of the load spring 18 at the head is dependent upon both the moment arm $l_1$ of the head and the moment arm of $l_2$ of the load spring, that is, $$K_{eg} = \frac{l_2}{l_1} K \text{ load spring,}$$

the head load force can be precisely adjusted by movement of translation mechanism 22 which changes the length of the load spring moment arm $l_2$. Also, since the moment arm of the head is much greater than the moment arm of the load spring, the equivalent spring rate of the load spring at the head is small, whereby the head load force change is small as the head is lifted.

From the foregoing it is apparent that, although not complex in design and of relatively low cost to produce, the rolling pivot arrangement has substantial advantages over the prior art. In addition to the advantages previously expounded upon, excessive upward movement of the arm 6 is prevented by upstop 30, preventing damage to flexure spring 11 and load spring 18. Also, head 8 can be easily aligned relative to head 4 by loosening the upstop 30 and precisely adjusting the position of head 8 with respect to fixed head 4, whereupon the upstop is tightened.

What is claimed is:
1. An apparatus for supporting a recording device comprising:
   a support arm,
   a carriage member,
   a flexure spring,
   means for securing a portion of said flexure spring to a first portion of an end section of said support arm and for securing another portion of said flexure spring to a portion of a section of said carriage member whereby said flexure spring couples said support arm to said carriage member,
   said flexure spring being located between said section of said support arm and said section of said carriage member,
   a second portion of said end section of said support arm having a smoothly curved surface adjacent a portion of said flexure spring whereby a rolling pivot along said curved surface is provided for said support arm when said support arm is moved relative to said carriage member.
2. The apparatus of claim 1 in which said curved surface has a constant rate of curvature.
3. An apparatus for supporting a recording device comprising:
   an elongated support arm,
   a carriage member,
   a flexure spring,
   first means for securing a portion of said flexure spring to a first portion of an end section of said support arm and for securing another portion of said flexure spring to a portion of a section of said carriage member whereby said flexure spring couples said support arm to said carriage member,
   said flexure spring being located between said section of said support arm and said section of said carriage member,
   a second portion of said end section of said support arm having a smoothly curved surface adjacent a portion of said flexure spring whereby a rolling pivot along said curved surface is provided for said support arm when said support arm is moved relative to said carriage member, and
   second means for forcing said second portion of said support arm toward said section of said carriage member.
4. The apparatus of claim 3 in which said second means is a tensioned spring.
5. The apparatus of claim 4 in which one end of said tensioned spring is coupled to said carriage member and the other end of said spring is coupled to a device which can be translated along the longitudinal axis of said support arm whereby the load force of the support arm can be adjusted.

* * * * *